United States Patent
Hakamata et al.

(12)

(10) Patent No.: US 6,447,821 B1
(45) Date of Patent: *Sep. 10, 2002

(54) SUGAR COATED PRODUCTS AND PROCESS FOR PREPARING THE SAME

(75) Inventors: Tetsuya Hakamata, Tokyo (JP); Yasuhiro Mochizuki, Yokohama (JP); Yasuo Noda, Morris Plains, NJ (US)

(73) Assignee: Warner-Lambert Company, Morris Plains, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,824

(22) PCT Filed: May 13, 1997

(86) PCT No.: PCT/US97/08098

§ 371 (c)(1),
(2), (4) Date: Apr. 5, 1999

(87) PCT Pub. No.: WO97/45021

PCT Pub. Date: Dec. 4, 1997

(30) Foreign Application Priority Data

May 30, 1996 (JP) ............................... 8-136431

(51) Int. Cl.[7] .............................. A23G 3/00; A23G 3/30
(52) U.S. Cl. ........................... 426/5; 426/302; 426/303; 426/660
(58) Field of Search ........................... 426/5, 291, 293, 426/295, 303, 305, 658, 304, 302, 660

(56) References Cited

U.S. PATENT DOCUMENTS

| 3,554,769 A | * | 1/1971 | Caillouet ..................... 99/140 |
| 4,154,867 A | | 5/1979 | Aldrich et al. ............... 426/659 |
| 4,762,719 A | | 8/1988 | Forester ....................... 424/440 |
| 4,792,453 A | | 12/1988 | Reed et al. .................... 424/5 |
| 4,826,845 A | * | 5/1989 | Zamudio-Tena et al. ....... 426/5 |
| 4,840,797 A | | 6/1989 | Boursier ....................... 424/475 |
| 5,478,593 A | | 12/1995 | Serpelloni et al. ............. 427/2 |

FOREIGN PATENT DOCUMENTS

| EP | 0201412 | 11/1986 |
| EP | 0415656 | 3/1991 |
| EP | 0608973 | 8/1994 |
| FR | 2535608 | 5/1984 |
| FR | 2740300 | 4/1997 |
| JP | 6292511 | 10/1994 |
| JP | 7067554 | 3/1995 |
| WO | 95/07622 | 3/1995 |

OTHER PUBLICATIONS

Merory, J., Food Flavorings, Composition, Manufacture, and Use., AVI Publishing., pp. 338, 1968.*

* cited by examiner

*Primary Examiner*—Arthur L. Corbin
(74) *Attorney, Agent, or Firm*—Linda A. Vag

(57) ABSTRACT

The Present invention pertains to improved sugar coated products having a hard coating of a fruity taste which products are prepared by applying a hard coating composed of a sugar alcohol over the surface of an edible core material, wherein a layer of the hard coating contains an acid.

7 Claims, No Drawings

SUGAR COATED PRODUCTS AND PROCESS FOR PREPARING THE SAME

FIELD OF THE INVENTION

This invention relates to a novel sugar coated product wherein a hard coating is applied to an edible core material and, more particularly, a novel sugar coated product wherein an edible core material is coated with a hard coating composed of a sugar alcohol, as well as a process for preparing the same.

BACKGROUND OF THE INVENTION

Heretofore, there has been prepared a sugar coated product comprising an edible core material coated with a hard coating according to the process wherein an edible core material is charged into a rotary pan, an appropriate amount of a saccharide solution is added to the material, while rotating the rotary pan, the saccharide solution is uniformly applied over the surface of the edible core material to form a saccharide coating over said surface, moisture is evaporated from the coating to form a crystalline saccharide layer and then this procedure is repeated until a sugar coated layer of the desired thickness is obtained.

As the saccharide materials which may be used for forming a hard coating, sucrose has been most commonly employed and a variety of sucrose-coated products have been commercialized. Of these coated products, there may be typically mentioned those having a hard coating wherein an edible core material with, for example, a mint-taste, a fruity taste or a coffee-taste is coated by a hard coating using sucrose.

However, when a fruity taste with both of a sweet taste and a sour taste is expected from a sugar coated product wherein an edible core of fruity taste is coated by a hard coating using sucrose as a saccharide material, the finished product has a drawback that a prolonged time is required for the edible core to dissolve in the mouth and thus the desired fruty taste cannot be immediately felt. Thus, the finished coated product has not been quite satisfactory as a fruity sugar coated product.

Then, it might have been conceived to prepare a saccharide solution by adding a sour agent to a saccharide solution for a hard coating and use the resulting solution for a hard coating. However, it is known that, when a sour agent is added to sucrose, the sucrose is partly decomposed to glucose and fructose by an acid component in the sour agent, whereby evaporation of moisture was remarkably retarded, and, in an extreme case, evaporation of moisture was made entirely infeasible, when a hard coating is applied using the saccharide solution. Then, it has not yet been attempted to add a sour agent to a saccharide solution as depicted above.

On the other hand, Japanese Patent Kokai 7-67554 discloses a process for the preparation of a sugar coated product using a soft coating, not a hard coating, by coating an edible core material with a powdery saccharide material together with a sour agent. However, this prior process is directed to a process for the preparation of a sugar coated product by a soft coating and then it is essentially distinct from a process for the preparation of a sugar coated product by a hard coating. The sugar coated product thus prepared is lacking in crispness and brittleness which the sugar coated product by a hard coating inherently possesses, while an amount of the sour agent to be added was only 0.006% by weight (0.01 part by weight in a sugar coated layer) in the finished product obtained according to the Test Example of the said prior art and then the said amount was simply of a negligible level without any need for considering the decomposition of sucrose to glucose and fructose by an acid, this being the reason for avoiding a combined use of sucrose with a sour agent as depicted above.

Further, there has been suggested a process for hard coating wherein a sour agent is added in a larger amount than the usual one and sucrose or a sugar alcohol such as maltitol is used. However, quite similarly, a fresh fruity taste could not be enjoyed immediately after eating and a sour taste could be first felt only when the core part begins to dissolve in the mouth, while the time required until an inherent fruity taste was felt could not be essentially shortened.

Moreover, there is suggested, for example, in Japanese Patent Kokai 6-292511 a process for the preparation of a sugar coated product with a low calorie value using a sugar alcohol instead of sucrose or the high calorie sugar used as a material for forming a sugar coated layer, but it is the primary object envisaged in this prior art to provide a low calorie product without paying any attention to the taste of a sugar coated product.

Accordingly, it has been desired to provide a sugar coated product which can be prepared by applying a hard coating to an edible core material and have the inherent crispness and brittleness which a sugar coated product prepared by a hard coating may have and can provide a sour taste immediately after eating, for instance, a sugar coated product with a fresh fruity taste which may be enjoyed immediately after eating.

SUMMARY OF THE INVENTION

The present inventors have made earnest studies to solve the above problems and, as a result, found that an excellent hard coating on an edible core material can be obtained by a hard coating using as a saccharide material a sugar alcohol, instead of sucrose, having no reducing end-groups susceptible to decomposition by a sour agent, that is to say, by a hard coating of an edible core material using a saccharide solution composed of a sugar alcohol and a sour agent, and that the sugar coated product thus prepared may have similar crispness and brittleness when eaten to those of the product prepared in the prior art by using sucrose as a saccharide material. This invention has been completed on the basis of the above findings.

DETAILED DESCRIPTION OF THE INVENTION

More particularly, this invention is concerned with a sugar coated product which comprises an edible core material, the surface of which is coated with a hard coating composed of a sugar alcohol, a layer of said hard coating containing a sour agent.

According to one aspect of this invention, there is provided a sugar coated product in which a hard coating composed of a sugar alcohol is formed by applying a saccharide solution comprising a sugar alcohol and a sour agent over the surface of an edible core material.

According to another aspect of this invention, there is provided a sugar coated product in which a hard coating composed of a sugar alcohol is formed by applying a saccharide solution composed of a sugar alcohol alone and a solid sour agent or a solution containing a sour agent separately and individually over the surface of an edible core material.

This invention is also concerned with a process for the preparation of a sugar coated product having a coated layer containing a sour agent which comprises applying over the surface of an edible core material a saccharide solution prepared by adding a sour agent to a sugar alcohol and evaporating moisture and then repeating said steps of application of the saccharide solution and evaporation, thereby forming a hard coating of saccharide layers.

Further, this invention is concerned with a process for the preparation of a sugar coated product having a coated layer containing a sour agent which comprises applying over the surface of an edible core material a saccharide solution prepared from a sugar alcohol and separately applying to the surface of an edible core material a solid sour agent or a solution containing a sour agent and evaporating moisture and then repeating said steps of application of the saccharide solution and evaporation, thereby forming a hard coating of saccharide layers.

More specifically, according to an embodiment of this invention, there is provided a sugar coated product which has a coated layer containing a sour agent by applying a saccharide solution, which has been prepared by adding the sour agent to a sugar alcohol, over the surface of an edible core material, for example, in a rotary pan and evaporating moisture and then repeating said steps of application of the saccharide solution and evaporation to form a hard coating of saccharide layers.

In another embodiment of this invention to incorporate a sour agent into a hard coating, there is provided a sugar coated product which has a coated layer containing a sour agent by applying a saccharide solution, which has been prepared from a sugar alcohol, over the surface of an edible core material and separately applying a sour agent in the form of a dry powder thereof or a solution containing said agent over the surface of an edible core material, for example, in a rotary pan and evaporating moisture and then repeating said steps to form a hard coating of saccharide layers.

More illustratively stated, 60–80 parts by weight of maltitol as a sugar alcohol is mixed with a sour agent, e.g., not more than 11 parts by weight of citric acid and the resulting mixture is made up to a total amount of 100 parts by weight with water to form a saccharide solution, said solution is applied over the surface of an edible core material, e.g., in a rotary pan and moisture is evaporated and then said procedures are repeatedly carried out to form a hard coating over the surface of the core material, whereby the desired sugar coated product is prepared.

According to another embodiment for practicing this invention, a saccharide solution is prepared by adding water to a sugar alcohol, e.g., 70–90 parts by weight of maltitol to make up to a total amount of 100 parts by weight, said saccharide solution is applied over the surface of an edible core material, e.g., in a rotary pan, and, during the subsequent step wherein moisture is evaporated, a sour agent separately prepared, e.g., an amount of not more than 11 parts by weight of citric acid is added or a solution of said amount of citric acid dissolved in the minimum volume of water is added and then said procedures are repeatedly carried out to form a hard coating over the surface of the core material, whereby the desired sugar coated product is prepared.

The sugar alcohol which may be used in this invention may include, for example, maltitol, sorbitol, lactitol, xylitol, erythritol and reducing paratinose and maltitol is preferable as a saccharide material for a hard coating. Also, there may be used a combination of maltitol with one or more of sugar alcohols selected from the group consisting of sorbitol, lactitol, xylitol, erythritol and reducing paratinose.

The sour agent which may be used in this invention may be any of those acids commonly used as a sour agent such as citric acid, malic acid, tartaric acid, etc. alone or in any combination of two or more thereof. An amount of the sour agent to be added is usually in the range of 0.9–5.0 parts by weight per 100 parts by weight of a finished sugar coated product. This range is believed to be practical one for fruity confectionery products in the light of the fact that a sour agent has been admixed typically in an amount of 0.5–2.0 parts by weight per 100 parts by weight of a fruity confectionery product and, from the standpoint of the amount to be added, this invention is also evidently distinguished from the range of the above Japanese Patent Kokai 7-67554.

The edible core material which may be used in this invention may include, for example, a chewing gum, a soft candy, a hard candy, a gummy candy, a tablet candy and others. Needless to say, any other similar materials may also be coated with a hard coating according to this invention.

This invention will be more fully explained by way of the following examples and comparative examples.

EXAMPLE 1

Formulations (1) to (6) shown in the following Table 1 were prepared according to a conventional hard coating method. More specifically, water was added to 72 parts by weight of a powder form of each sugar alcohol as indicated below, 2 parts by weight of acacia and 2 parts by weight of citric acid to make up to a total amount of 100 parts by weight to prepare a saccharide solution. An aliquot of the saccharide solution was added and mixed with core chewing gums in a rotary pan. When the chewing gums were uniformly coated over the surface thereof with the saccharide solution, drying was initiated and, after completion of the drying, the saccharide solution was again added in the same manner as described above, and this procedure was repeated until there were provided 35 parts by weight of a hard coated layer to 65 parts by weight of the core chewing gum. At the end of this time, the final drying step was applied to finish the preparation.

TABLE 1

(unit: part by weight)

| | Formulations | | | | | |
|---|---|---|---|---|---|---|
| | (1) | (2) | (3) | (4) | (5) | (6) |
| Chewing gum | 65 | 65 | 65 | 65 | 65 | 65 |
| Citric acid | 0.9 | 0.9 | 0.9 | 0.9 | 0.9 | 0.9 |
| Acacia | 0.9 | 0.9 | 0.9 | 0.9 | 0.9 | 0.9 |
| Maltitol | 33.2 | | | | | |
| Sorbitol | | 33.2 | | | | |
| Lactitol | | | 33.2 | | | |
| Xylitol | | | | 33.2 | | |
| Erythritol | | | | | 33.2 | |
| Reducing paratinose | | | | | | 33.2 |
| Total | 100.0 | 100.0 | 100.0 | 100.0 | 100.0 | 100.0 |

COMPARATIVE EXAMPLE 1

The following comparative formulation was prepared according to a conventional hard coating method. More specifically, water was added to 72 parts by weight of sugar, 2 parts by weight of acacia and 2 parts by weight of citric acid to make up to a total amount of 100 parts by weight to obtain a saccharide solution. Thereafter, a hard coating was carried out in a rotary pan in the same manner as described in Example 1.

TABLE 2

(unit: part by weight)

|  | Comparative Formulation (1) |
|---|---|
| Chewing gum | 65 |
| Sugar | 33.2 |
| Citric acid | 0.9 |
| Acacia | 0.9 |
| Total | 100.0 |

COMPARATIVE EXAMPLE 2

The following comparative formulations were prepared using the same formulations as described in Example 1 except that citric acid was omitted. More specifically, the same procedure as described in Example 1 was used except that 74 parts by weight of each sugar alcohol and 2 parts by weight of acacia were used.

TABLE 3

(unit: part by weight)

| | Comparative Formulations | | | | | |
|---|---|---|---|---|---|---|
| | (2) | (3) | (4) | (5) | (6) | (7) |
| Chewing gum | 65 | 65 | 65 | 65 | 65 | 65 |
| Acacia | 0.9 | 0.9 | 0.9 | 0.9 | 0.9 | 0.9 |
| Maltitol | 34.1 | | | | | |
| Sorbitol | | 34.1 | | | | |
| Lactitol | | | 34.1 | | | |
| Xylitol | | | | 34.1 | | |
| Erythritol | | | | | 34.1 | |
| Reducing paratinose | | | | | | 34.1 |
| Total | 100.0 | 100.0 | 100.0 | 100.0 | 100.0 | 100.0 |

The hard coated chewing gum prepared using the formulations as described in Example 1 was obtained without any difference in the time required for effecting all steps as compared with the hard coating shown in Comparative Example 2 containing no citric acid, and a sour taste could be felt immediately after chewing, which is as contemplated in this invention.

On the other hand, the hard coated chewing gum prepared using the formulation as described in Comparative Example 1 required an extremely prolonged period of time in the drying step due to a large amount of citric acid in the saccharide solution, and also produced an uneven surface because chewing gum grains were rubbed against each other while moistened, and any practical preparation of the hard coated chewing gum could not be accomplished.

EXAMPLE 2

For studying the sort or type of sour agents, there were prepared the following Formulations (7) to (9) as shown in Table 4 according to a conventional hard coating method. More specifically, water was added to 72 parts by weight of maltitol, 2 parts by weight of acacia and 2 parts by weight of the indicated sour agent to make up to a total amount of 100 parts by weight to prepare a saccharide solution. An aliquot of the saccharide solution was added and mixed with core chewing gums in a rotary pan. Thereafter the same procedure as described in Example 1 was repeated until there were provided 35 parts by weight of a hard coated layer to 65 parts by weight of the core chewing gum.

TABLE 4

(unit: part by weight)

| | Formulations | | |
|---|---|---|---|
| | (7) | (8) | (9) |
| Chewing gum | 65 | 65 | 65 |
| Maltitol | 33.2 | 33.2 | 33.2 |
| Acacia | 0.9 | 0.9 | 0.9 |
| Citric acid | 0.9 | | |
| Tartaric acid | | 0.9 | |
| Malic acid | | | 0.9 |
| Total | 100.0 | 100.0 | 100.0 |

The Formulations (7) to (9) were applicable for a hard coating and, in an organoleptic aspect, a sour taste could be felt immediately after chewing, which is as contemplated in this invention.

EXAMPLE 3

For studying an amount of the sour agent to be added, the following Formulations (10) and (11) were prepared in the same manner as described in Example 1.

TABLE 5

(unit: part by weight)

| | Formulations | |
|---|---|---|
| | (10) | (11) |
| Chewing gum | 65 | 65 |
| Maltitol | 27.6 | 29.1 |
| Acacia | 0.9 | 0.9 |
| Citric acid | 2.5 | 5.0 |
| Total | 100.0 | 100.0 |

More specifically, to 68.55 parts by weight of maltitol was added 5.45 parts by weight of citric acid and to 63.10 parts by weight of maltitol was added 10.90 parts by weight of citric acid. To each mixture was added 2 parts by weight of acacia and then water was added to make up to a total amount of 100 parts by weight. The chewing gums prepared using said Formulations required a more prolonged period of time for drying as compared with those of Example 1, but they had the hard coated surface at the same level as in Example 1. In view of the results from Examples 1 and 3, it is suggested that a sour agent may be added to all hard coating layers or a sour agent may be added to a specific layer, by which a wide applicability of this invention could be confirmed.

EXAMPLE 4

In order to prove that this invention may be effectively applicable even when an edible core material is other than a chewing gum, the following Formulations according to this invention were prepared and tested. Coating was applied in the same manner as described in Example 1.

TABLE 6

(unit: part by weight)

| | Formulations | | | |
|---|---|---|---|---|
| | (12) | (13) | (14) | (15) |
| Strawberry-tasted hard candy | 65 | | | |
| Strawberry-tasted soft candy | | 65 | | |
| Grapefruit-tasted gummy candy | | | 65 | |
| Mint-tasted tablet candy | | | | 65 |
| Maltitol | 33.2 | 33.2 | 33.2 | 33.2 |
| Acacia | 0.9 | 0.9 | 0.9 | 0.9 |
| Citric acid | 0.9 | 0.9 | 0.9 | 0.9 |
| Total | 100.0 | 100.0 | 100.0 | 100.0 |

The hard coating of this invention could be prepared without any difficulty by using any of the above core materials and, in an organoleptic aspect, a sour taste could be felt immediately after eating.

EXAMPLE 5

In order to study any other methods for incorporating a sour agent than the method for incorporating the agent into a saccharide solution prepared from a sugar alcohol, chewing gums were prepared with the Formulation (11) as defined above except that the citric acid was used in the form of a solid or a solution thereof according to a conventional hard coating method.

More specifically, to 72 parts by weight of maltitol was added 2 parts by weight of acacia and a total amount was made up to 100 parts by weight with water. During the step wherein said saccharide solution was applied for a hard coating of chewing gums, the hard coating procedure was repeated while 5 parts by weight of citric acid was applied directly to the surface of chewing gums at any appropriate time, and this procedure was repeated until there were provided 35 parts by weight of a hard coated layer to 65 parts by weight of the core chewing gum. At the end of this time, the final drying step was applied to finish the preparation.

Alternatively, 5 parts by weight of citric acid was dissolved in the same amount of water to form an acid solution and the hard coating procedure was repeated while said acid solution was used at any appropriate time in a hard coating with a saccharide solution composed of maltitol and acacia, whereby chewing gums were prepared.

The same level of the finished state of the product as shown in Example 3 was observed in this Example even when such different methods for incorporating a sour agent were used. In other words, it has been confirmed that a sour agent may be incorporated directly into a saccharide solution or the agent may be used for a hard coating in the form of a solid or a solution thereof, separately and independently from a saccharide solution.

What is claimed is:

1. A sugar coated product which comprises an edible core material, the surface of which is coated with a hard coating composed of a sugar alcohol, a layer of said hard coating containing an acid selected from the group consisting of citric acid, malic acid and tartaric acid, or mixtures thereof, in an amount of 0.9 to 5.0 percent by weight of the sugar coated product.

2. The sugar coated product as claimed in claim 1 wherein the hard coating composed of a sugar alcohol is formed by applying a saccharide solution, prepared by adding said acid agent to a sugar alcohol, over the surface of an edible core material.

3. The sugar coated product as claimed in claim 1 wherein the hard coating composed of a sugar alcohol is formed by applying a saccharide solution, composed of a sugar alcohol alone, and said acid or a solution containing said acid separately and independently over the surface of the edible core material.

4. The sugar coated product as claimed in any of claims 1 to 3 wherein said sugar alcohol is one or more of sugar alcohols selected from the group consisting of maltitol, sorbitol, lactitol, xylitol, erythritol and reducing paratinose.

5. A process for the preparation of a sugar coated product containing an acid, selected from the group consisting of citric acid, malic acid and tartaric acid, or mixtures thereof, in an amount of 0.9 to 5.0 percent by weight of the sugar coated product, in a coated layer which comprises applying a saccharide solution, prepared by adding said acid to a sugar alcohol, over the surface of an edible core material and evaporating moisture and then repeating said steps of applying the saccharide solution and evaporating moisture to form a hard coating composed of saccharide layers.

6. A process for the preparation of a sugar coated product containing an acid, selected from the group consisting of citric acid, malic acid and tartaric acid, or mixtures thereof, in an amount of 0.9 to 5.0 percent by weight of the sugar coated product, in a coated layer which comprises applying a saccharide solution, prepared from a sugar alcohol, over the surface of an edible core material and separately applying said acid or a solution containing said acid over the surface of the edible core material and evaporating moisture and then repeating said steps of applying the saccharide solution and evaporating moisture to form a hard coating composed of saccharide layers.

7. A process for the preparation of a sugar coated product as claimed in claim 5 or 6 wherein said sugar alcohol is one or more of sugar alcohols selected from the group consisting of maltitol, sorbitol, lactitol, xylitol, erythritol and reducing paratinose.

* * * * *